T. H. ANDRESS.
Thill Coupling.
No. 94,267.           Patented Aug. 31, 1869.
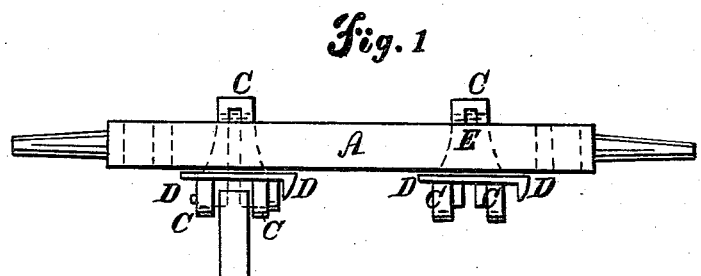
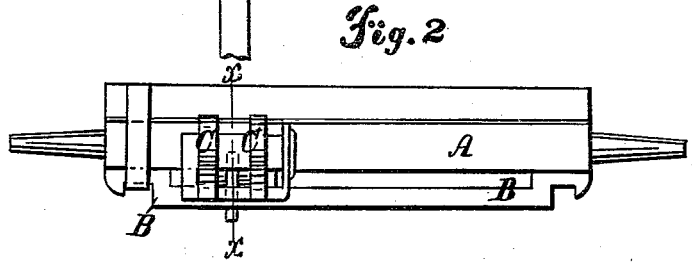
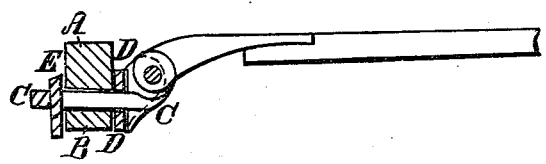

United States Patent Office.

T. H. ANDRESS, OF SPARTA, NEW JERSEY, ASSIGNOR TO HIMSELF AND JOHN DECKER, OF SAME PLACE.

Letters Patent No. 94,267, dated August 31, 1869.

IMPROVED THILL-COUPLING.

The Schedule referred to in these Letters Patent and making part of the same.

To all whom it may concern:

Be it known that I, T. H. ANDRESS, of Sparta, in the county of Sussex, and State of New Jersey, have invented a new and improved Adjustable Thill-Coupling; and I do hereby declare that the following is a full, clear, and exact description thereof, which will enable others skilled in the art to make and use the same, reference being had to the accompanying drawing, forming part of this specification, in which—

Figure 1 is a top view of my improved thill-coupling as attached to an axle.

Figure 2 is a front view of the same.

Figure 3 is a detail sectional view of the same, taken through the line x x, fig. 2.

Similar letters of reference indicate corresponding parts.

My invention has for its object to furnish an improved thill-coupling, which shall be simple in construction, and easily and quickly adjusted to the distance apart of the thill or tongue-irons to be attached, and which will hold them securely and safely in whatever position they may be adjusted; and It consists in the construction and combination of the various parts of the coupling, as hereinafter more fully described.

A represents the axle, upon the under side of which is placed a long bar, B, having an offset near each end, as shown in fig. 2, so as to form a narrow opening between the said bar B and the axle A, to receive the shank of the coupling.

The bar B is secured to the axle A by the same clips, by means of which the wooden piece, placed upon the upper side of the said axle, is secured to it, the said bar B being notched upon its under side, at its ends, to receive the said clips.

C is the coupling, the shank of which is made flat, to fit into the space between the bar B and the axle A, and is slotted from its forward end nearly to its rear end, as shown in fig. 3, and in dotted lines in fig. 1. This slot allows the forward end or ears of the coupling to be sprung apart a little to receive a wider thill-iron when necessary. Upon the forward end of the coupling C are formed ears, between which the thill-irons are placed, and through which is passed the bolt, by means of which the said thill-irons are connected to the said coupling.

D is a plate, which is slotted to receive the flattened shank of the coupling C, and upon one end of which is formed an outwardly-projecting flange.

The flange of the slotted plate D, when the coupling is secured to the axle, overlaps the head of the coupling-bolt, so that no nut or key will be required to keep the said bolt in its place.

The coupling is secured to the axle A and bar B by the wedge-key E, which is driven into the inner end of the slat in the coupling C, at the rear side of the axle A and bar B, as shown in figs. 1 and 3.

The key E is kept from working out by a spring-key, passed through a hole in the lower part of the said key E; or, if desired, the coupling C may be secured in place by a nut screwed upon its rear end, and resting against the axle A and bar B. This construction allows the two couplings to be adjusted further apart or closer together, as the distance apart of the thill or tongue-irons may require.

Having thus described my invention,

What I claim as new, and desire to secure by Letters Patent, is—

The combination of the slotted plate D, flanged at one end, with the coupling C, bar B, and axle A, substantially as herein shown and described, and for the purpose set forth.

T. H. ANDRESS.

Witnesses:
C. P. CARMICHAEL,
JOHN A. POTTER.